Sept. 14, 1937.  R. RANSOM ET AL  2,093,365
DEVICE FOR DELIVERING MEASURED QUANTITIES OF LIQUIDS
Filed Jan. 3, 1936  3 Sheets-Sheet 1

INVENTORS
RICHARD RANSOM
ALBERT G. BERWICK
By Norris & Bateman
ATTORNEYS

INVENTORS
RICHARD RANSOM
ALBERT G. BERWICK
By Norris & Bateman
ATTORNEYS

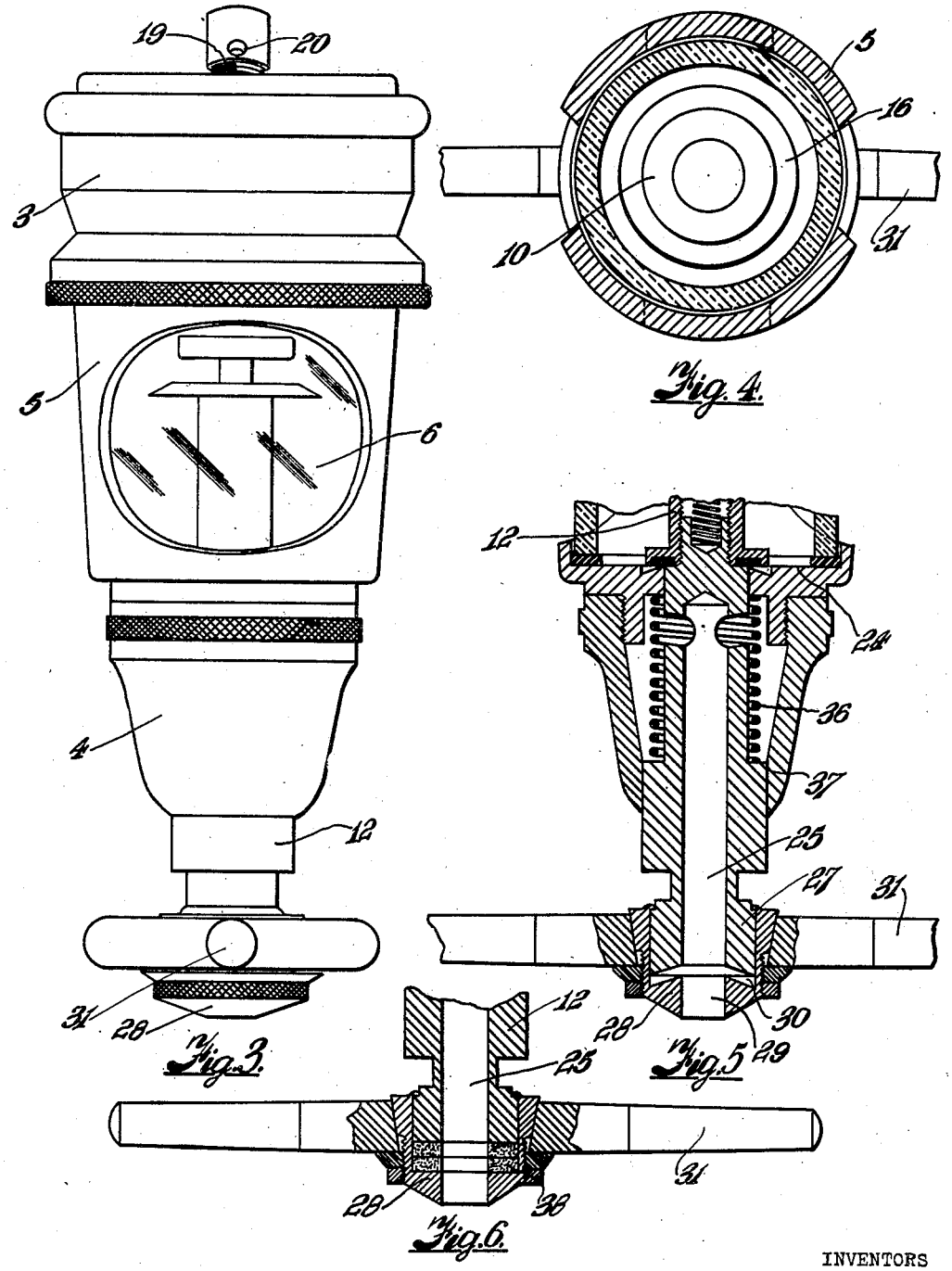

Patented Sept. 14, 1937

2,093,365

UNITED STATES PATENT OFFICE 2,093,365

DEVICE FOR DELIVERING MEASURED QUANTITIES OF LIQUIDS

Richard Ransom, Colliers Wood, London, and Albert George Berwick, Upper Mitcham, England, assignors to Non-Drip Measure Company Limited, Streatham, London, England Application January 3, 1936, Serial No. 57,438
In Great Britain January 9, 1935

14 Claims. (Cl. 226—108)

This invention relates to devices for delivering measured quantities of liquid and has for its object to provide an improved construction and arrangement capable of adaptation to any liquid container and enabling an exact predetermined quantity of liquid to be supplied to a receptacle at each operation of the device.

According to one form of the invention the improved device for delivering measured quantities of liquid comprises a measuring chamber and means responsive to pressure by the receptacle to be filled to release liquid from said chamber whilst causing air to be supplied thereto as the fluid flows out.

According to another form of the invention a device for delivering measured quantities of liquid is provided comprising a measuring chamber, an axially movable valve member therein, means extending through the base of the apparatus for operating said valve member by upward pressure exerted by the receptacle to be filled and an air inlet adapted to be opened by said valve member when raised.

Reference will now be made to the accompanying drawings which illustrate by way of example constructions according to the invention and in which:—

Figure 1:
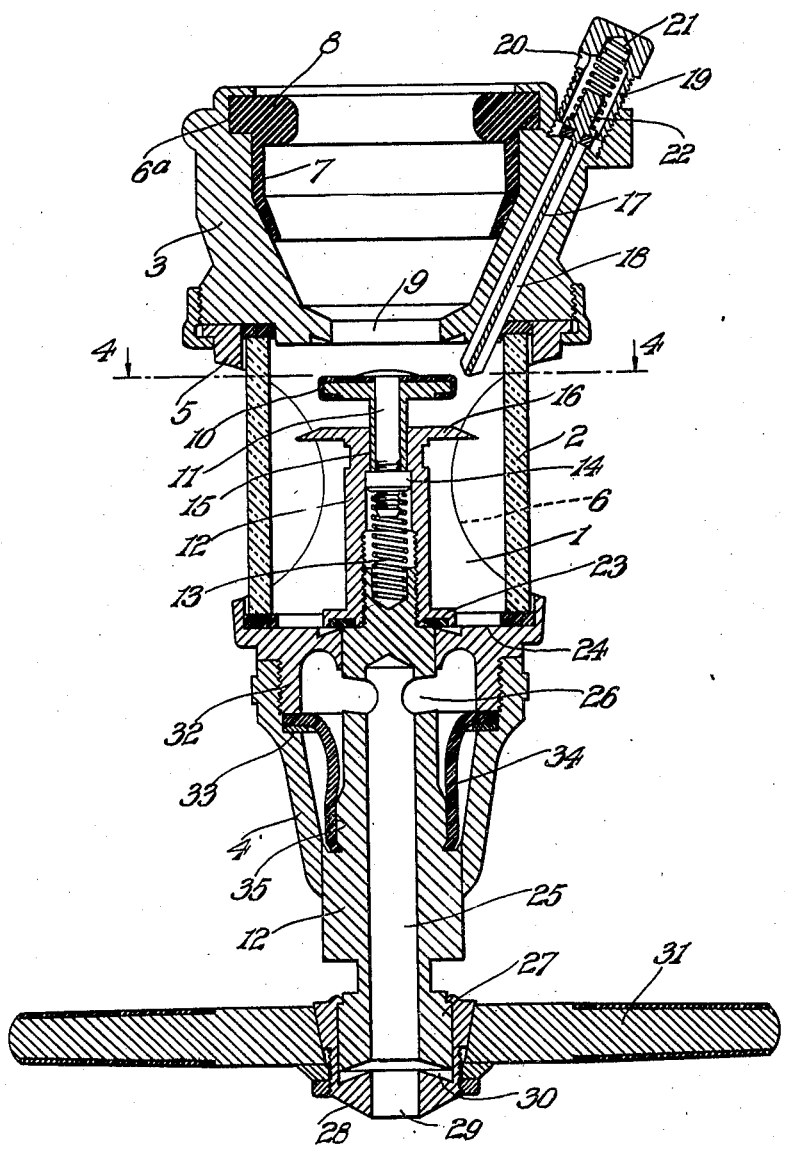
Figure 2:
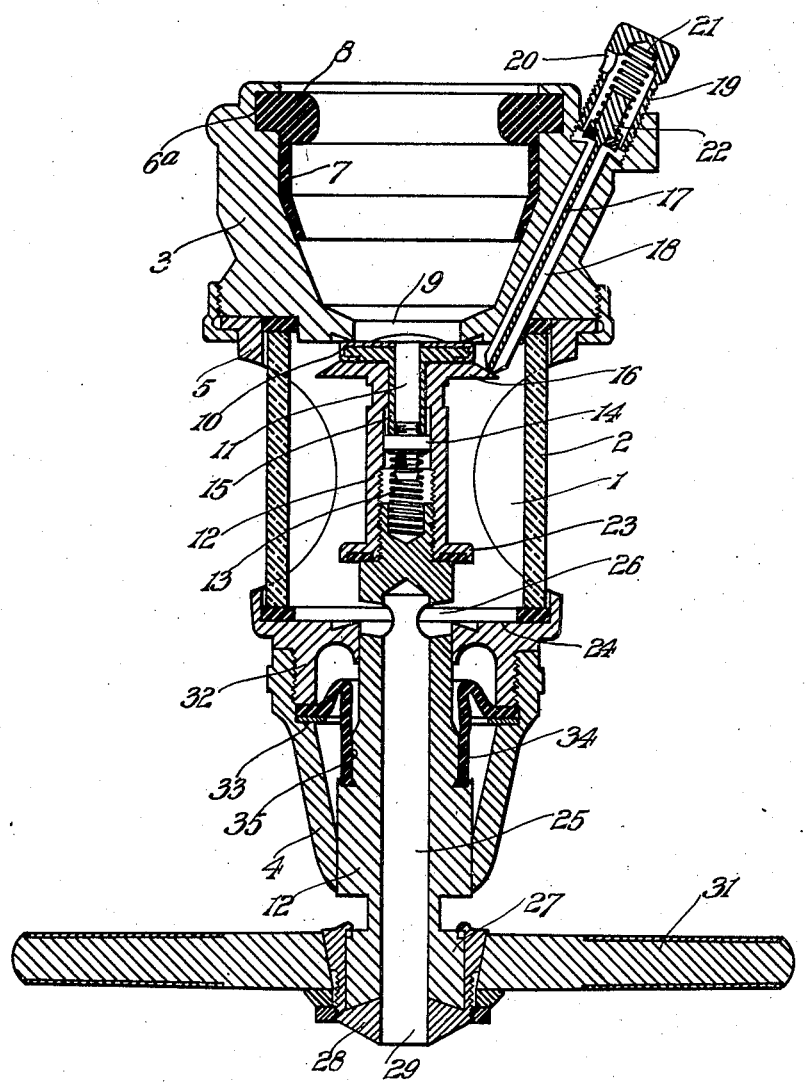

Fig. 1 is a sectional elevation of a liquid measuring device showing the parts in their inoperative positions, Fig. 2 is a sectional elevation similar to Fig. 1 with the parts in the operative positions, Fig. 3 is an outside elevation of the device shown in Figs. 1 and 2, Fig. 4 is a sectional plan taken on the line 4—4 of Fig. 1, Fig. 5 is a fragmentary view showing an alternative means for restoring the parts to normal position after operation and Fig. 6 is a fragmentary view of a drip prevention device.

In the construction illustrated in Figs. 1–4 the improved device for delivering measured quantities of liquid comprises a measuring chamber 1 having a cylindrical glass wall 2 closed at its upper and lower ends respectively by housing elements 3 and 4 connected by a cylindrical metal wall 5 having openings 6 to permit inspection of the interior of the measuring chamber 1. The housing element 3 is substantially cup shaped and will in practice vary in form according to the nature of the vessel from which the supplies of liquid are to be withdrawn.

In the construction illustrated the housing element 3 is designed to fit over the mouth of an inverted bottle and for this purpose the inner wall of the housing 3 is formed with an annular recess 6a, which forms a seating for an india rubber sleeve 7 having an internal rim or beading 8 so as to form simultaneously a cushioning means for the neck of the bottle and a fluid tight connection, the internal beading 8 having sufficient resiliency to enable the bottle to be removed when empty by exerting a sharp upward pull. The resilient character of this device also enables it to yield sufficiently to admit within limits bottle necks of various sizes. The lower end of the sleeve 7 is tapered, its small end being less in diameter than the beading 8 and due to the thinness of the wall at this part fluid tight connection with the outside of a bottle mouth can be made whether it is concentric with the sleeve or not.

The housing 3 communicates with the measuring chamber 1 through an inlet 9 which is normally open but during delivery of the measured quantity of liquid this inlet is adapted to be closed by a valve member 10 carried on a stem 11 movably mounted in the upper end of a valve stem 12 which extends through the base of the measuring chamber and through the housing 4 from the lower end of which the lower end of said valve stem protrudes. Below the stem 11 is disposed a spring 13 whose upper end abuts against a collar 14 on the stem whose outward movement is limited by engagement of this collar with a neck portion 15 formed internally of the valve stem 12 whose upper end terminates in a mushroom head 16 which, as hereinafter described, engages in its uppermost position a stem 17 which extends into the measuring chamber and which is grooved or fluted to form passages 18 adapted to communicate with a valve chamber 19 having an air inlet port 20 but normally cut off therefrom owing to a spring 21 maintaining a valve member 22 in closed position. The said valve member is formed or mounted on the upper end of the stem 17.

The stem 12 is formed with a flange 23 which engages the base 24 of the measuring chamber 1 and limits the downward movement of the said stem. The lower portion of the stem is hollow being formed with a discharge passage 25 terminating at its upper end in laterally extending ports 26. The lower end of the stem 12 has a portion 27 of enlarged diameter over which is slidably mounted an extension 28 within which is a continuation 29 of the passage 25 whilst between the members 27 and 28 is formed a downwardly directed annular recess 30 into which fall any drips of liquid which may trickle down the wall of the passage 25 after delivery of a measured quantity.

Extending laterally from the member 28 are two diametrically opposed arms 31 preferably covered by india rubber sleeves and against which the rim of a glass or other receptacle is caused to bear when exerting upward pressure to operate the device.

The housing element 4 is attached by an internally screw threaded portion to an extension 32 on the base 24 of the measuring chamber and between the annular extension 32 and an annular shoulder 33 in the housing is clamped the upper end of an india rubber sleeve 34 whose lower end engages around a recessed portion 35 of the stem 12, this rubber sleeve 34 acting as a liquid seal to prevent leakage along the stem 12 and also as a compressible resilient member for restoring the parts to normal position after operation.

The operation of the device above described is as follows:—

When it is desired to obtain a measured quantity of liquid from the chamber 1 the glass or other receptacle to receive the charge of liquid is pressed upward beneath the arms 31 which causes vertical axial movement of the stem 12 so that the valve member 10 is raised to close the passage 9 and prevent further liquid entering the chamber 1. The continued upward pressure on the valve stem 12 causes this stem to move relatively to the stem 11 whereby the spring 13 is compressed and the head 16 brought into contact with the stem 17 to open the air inlet valve 22 the parts being then in the positions shown in Fig. 2. By this time the ports 26 have reached a position in which liquid can pass through them from the chamber 1 and escape through passages 25 and 29, the air valve 22 enabling air to enter the measuring chamber to enable the liquid to be discharged. During the initial stages of operation the member 28 is moved upwards relatively to the member 27 thereby expelling into the receptacle below any liquid which may have collected in the recess 30.

When the measured quantity has been delivered and the receptacle removed the combined action of spring 13 and the india rubber sleeve 34 restores the parts to the normal position shown in Fig. 1, the air valve 22 being closed by its spring 21 and the air in chamber 1 passing upwards and replacing the liquid which immediately leaves the bottle to fill the chamber 1 afresh.

The invention is not limited to the precise details of construction and arrangement above described as instead of or in addition to employing the india rubber sleeve 34 the lower portion of the stem 12 may be surrounded by a spring 36 (Fig. 5) whose upper end bears upon the underside of the base 24 of the measuring chamber and whose lower end bears against a shoulder 37 formed on the stem 12 against which the lower end of sleeve 34 otherwise abuts.

In Fig. 6 an alternative form of drip prevention device is illustrated. In this case the member 28 is formed with an internal recess in which are disposed a layer or layers of absorbent material 38 such as felt which will absorb any liquid passing down the walls of the passage 25. When the device is operated the pressure applied through the arms 31 will tend to compress the felt and expel therefrom any liquid which may have been absorbed.

Where the device described is to be used for withdrawing measured quantities from a vessel such as a tank the sleeve 7 can be dispensed with and the upper housing element 3 shaped for direct connection to the tank outlet.

We claim:—

1. A device for delivering measured quantities of liquid comprising a measuring chamber, an axially movable valve operating member therein, an inlet valve seat through which liquid enters said chamber, an inlet valve closed against said inlet valve seat by initial movement of said member and held against said seat by continued movement of said member in one direction, an air valve opened by continued movement of said member in said one direction, said member having ports therein through which discharge of the measured quantity of liquid takes place.

2. A device for delivering measured quantities of liquid comprising a measuring chamber, a valve operating member axially movable therein, means extending through the base of the apparatus for operating said member by upward pressure exerted by the receptacle to be filled, a liquid inlet valve mounted in the upper end of said member to close the inlet to said chamber, an air inlet valve, means movable relatively to said liquid inlet valve after closure thereof to open said air inlet valve, said valve operating member having a passage therein for discharging a measured quantity of liquid through it.

3. A device for delivering measured quantities of liquid comprising a measuring chamber, a valve operating member movable axially therein, an inlet closure valve slidably mounted upon said valve operating member, an air valve, means carried by said valve operating member to control said air valve, said valve operating member having a discharge passage therein through which the measured liquid may flow.

4. A device according to claim 3, wherein said valve operating member extends downwardly through the base of the measuring chamber and carries means adapted to be contacted by upward movement of a receptacle to be filled.

5. A device according to claim 3, together with a sleeve-like, resilient deformable element encircling said valve operating member and being operable to seal said valve operating member against leakage and restore it to normal position after operation.

6. A device according to claim 3, wherein the upper end of said measuring chamber communicates with a chamber having therein resilient means for making fluid tight engagement around the open end of a container from which the supplies of liquid are drawn, said resilient means being operable to frictionally couple said device to said container.

7. A device according to claim 3, wherein said valve operating member extends through the base of the measuring chamber and carries at its lower end means movable relatively to it for preventing drips from being discharged after discharge of a measured quantity of liquid.

8. A device for delivering measured quantities of liquid comprising a measuring chamber, a casing connected to said chamber, a valve operating member axially movable in said chamber and casing under pressure from a receptacle to be filled, an inlet closure valve resiliently mounted in the upper end of said operating member, an air inlet valve for said chamber, means carried by said operating member to open the air inlet after said inlet closure valve has closed by moving said member upwardly, and an india rubber sleeve enclosed within said casing and surrounding the lower end of said operating member and engaging the casing and adapted to return said member downwardly to normal position after said receptacle has been moved away from the device.

9. A device according to claim 8 wherein one end of said india rubber sleeve is connected to the inner fixed wall of said casing and the other end abuts against a recess in the said valve operating member and is disposed in sealing engagement therewith.

10. In a liquid measuring device, a generally upright hollow body member having an upper inlet port and a lower discharge port, said ports being substantially vertically aligned and said inlet port communicating with a liquid source, a valve operating member mounted for substantially vertical reciprocation in said body member and having valve means cooperating with, and operable to cut off liquid flow through said inlet and discharge ports, an air valve mounted for reciprocation in said body member and operable to place the interior of said body member in communication with the atmosphere, said valve operating member when moved in one direction being operable to first close said inlet port and then open said air valve and said discharge port.

11. The measuring device defined in claim 10, wherein said air valve embodies a part disposed in the path of movement of a portion of said valve operating member and is operable to be contacted thereby after said inlet port has been closed by movement of the valve operating member in said one direction.

12. In a liquid measuring apparatus, a measuring chamber and valve mechanism embodying a hollow valve operating rod through which the measured liquid is adapted to flow, said rod projecting below the apparatus and carrying an element thereon which is adapted to be engaged by the receptacle into which the measured fluid is to be discharged, said element being mounted for limited vertical movement with respect to said rod, and having a port communicating with the interior thereof, said element embodying means whereby when it is in its upper position it will provide a substantially continuous conduit for said liquid and when it is in its lower position it will provide means for retaining any liquid that may drain from the interior of said hollow valve operating member.

13. The liquid measuring apparatus defined in claim 12, wherein said means comprises an upwardly facing recess provided in said element into which said liquid may drain.

14. The liquid measuring apparatus defined in claim 12, wherein said means comprises a porous body disposed between said hollow valve operating rod and said element and adapted to be compressed therebetween when the latter is moved upwardly.

RICHARD RANSOM.
ALBERT GEORGE BERWICK.